Patented June 19, 1923.

1,459,698

UNITED STATES PATENT OFFICE.

BORIS H. TEITELBAUM, OF BROOKLYN, NEW YORK, ASSIGNOR TO HARRY M. KORETSKY, OF BROOKLYN, NEW YORK.

DEPOLARIZER.

Original application filed December 3, 1919, Serial No. 342,242. Divided and this application filed December 22, 1920. Serial No. 432,602.

No Drawing.

*To all whom it may concern:*

Be it known that I, BORIS H. TEITELBAUM, a citizen of the United States, and resident of the city of New York, borough of Brooklyn, county of Kings, and State of New York, have invented a new and Improved Depolarizer, of which the following is a full, clear, and exact description.

This invention relates to improvements in depolarizers, having reference more particularly to a dry battery, including zinc chloride as an ingredient in the electrolyte, and is a division of an application on a dry cell filed by me upon December 3, 1919, Serial #342242.

An object of this invention is to provide a dry battery which will have a low internal resistance and consequently a high short circuit amperage.

Another object of this invention is to provide a dry battery which will have a large service capacity and which will remain out of service for a long period of time without deterioration.

It has been found that the use of zinc chloride in the electrolyte of a dry battery and also in the depolarizing mixture, decreases the rapid consumption of the zinc electrode, by the sal ammoniac when the battery is not in service, owing to the fact that the solution tension of the zinc in the solution of sal ammoniac is counterbalanced by the osmotic pressure of the zinc ions in the solution of sal ammoniac. It is thought that the zinc chloride in the solution of sal ammoniac also prevents local action on the zinc electrode. However, heretofore the zinc chloride has been added to the electrolyte in very large proportions, and as a result insoluble zinc hydroxide and double salts of zinc are formed which precipitate from the electrolyte and clog up the interstices in the depolarizing core so that the internal resistance of the dry battery is rapidly increased in use, thus rapidly diminishing the short circuit amperage. The clogging of the depolarizing core by these insoluble salts also prevents the passage of the ammonia gas generated in the battery so that said battery often bursts. These insoluble salts also absorb some moisture from the paste in their formation so that the moisture content in the electrolyte is diminished.

It is known that the primary reaction which occurs in a dry battery having a zinc electrode, and an electrolyte containing sal ammoniac, is as follows:

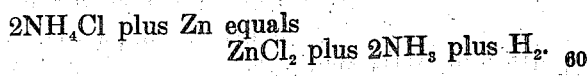

When an excess of zinc chloride is present, as is commonly found in the ordinary dry battery, the ammonia reacts with the zinc chloride according to the following reaction;

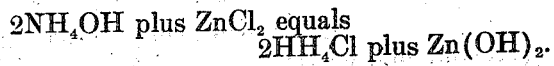

This zinc hydroxide precipitates and eventually clogs up the interstices of the depolarizing core so that the internal resistance of the dry battery is greatly increased.

I have found by experiment that when zinc is brought into contact with an aqueous solution of its salts such as zinc chloride of any concentration whatever, there is neither a perceptible passage of zinc into solution, nor a deposition of zinc from the solution. Thus it seems that even small percentages of zinc chloride in a solution will prevent the zinc from going into solution and will also prevent the phenomenon commonly known as local action. This fact is probably due to some electro-chemical relations between the zinc and its salt.

As the result of a series of experiments, I have arrived at the following proportions for making my electrolytic paste and my depolarizing core so as to avoid an excess of zinc chloride.

Zinc chloride free from iron is dissolved in distilled water until a specific gravity of 1.25 or a Baumé test of 29 degrees is reached. At a temperature of about 70 degrees Fahrenheit the solution will now be found to contain 26.36% of zinc chloride. The solution is filtered to get rid of the insoluble impurities in the salt and for each 100 parts by weight of the filtrate, a gram molecular weight or 53.5 parts by weight of sal ammoniac is added. After the sal ammoniac is completely dissolved, the solution is again filtered and flour or starch or a mixture of both is then added to the filtrate in amounts just sufficient to gelatinize. I have found that this electrolyte contains the chemicals in the most desirable proportions so that the osmotic pressure of the zinc chloride counterbalances the solution tension of the zinc electrode and prevents local action, but does not afford an excess of the zinc chloride so that no insoluble hydroxide or double salts of zinc are formed.

In the compounding of the depolarizing mixture heretofore, a very fine manganese dioxide powder has been used which while it gives a greater surface for depolarization, greatly increases the internal resistance of the battery and consequently decreases the short circuit amperage of the battery. Also when a very fine manganese dioxide powder is molded under the noncontrolled pressure of the human hand or of machines in use at present, a depolarizing core is formed which is not porous enough to afford passage to the gases generated, so that the battery frequently bursts. I have heretofore found that the most ideal grain size of manganese dioxide which can be used is one in which the grains will pass through a sieve having forty meshes to the linear inch, but will be retained on a fifty mesh sieve. I then mix the manganese dioxide thoroughly with a suitable quantity of granular graphite of the same size, said graphite serving to increase the conductivity of the mixture. I then subject the mixture of manganese dioxide and graphite to a current of hot air at a temperature of 80–100 degrees C. which will drive off any volatile matter which may be present in the mixture without decomposing the manganese dioxide. The mixture of manganese dioxide and graphite is then cooled and moistened with a mixture of the aforementioned zinc chloride-ammonium chloride solution, and one part by weight of glacial acetic acid. The slight amount of organic matter present in the manganese dioxide dissolves in the acetic acid and reduces the internal resistance of the battery, thereby increasing the short circuit amperage thereof. After the graphite-manganese dioxide mixture is treated in the aforementioned manner, it is molded into shape around a stick of carbon which serves as the positive electrode of the battery.

I would state in conclusion that while the described example constitutes a practical embodiment of my invention, I do not limit myself strictly to the aforementioned details, since manifestly the same can be considerably varied without departure from the spirit of the invention, as defined in the appended claims.

I claim:

1. A dry battery provided with a depolarizing mixture containing grains of manganese dioxide of a size small enough to pass through a sieve having 40 meshes per linear inch, but large enough to be retained by a sieve having 50 meshes per linear inch.

2. A step in the process for making a depolarizing mixture for a dry battery, which consists in mixing granular graphite with manganese dioxide composed of grains of such size as to pass through a sieve having 40 meshes to the linear inch, but to be retained on a sieve having 50 meshes to the linear inch, and subjecting the mixture of manganese dioxide and graphite to a current of hot air at a temperature of from 80 to 100 degrees C.

BORIS H. TEITELBAUM.